US011192628B2

(12) United States Patent
Tsai et al.

(10) Patent No.: US 11,192,628 B2
(45) Date of Patent: Dec. 7, 2021

(54) ARTICULATED FLAP SUPPORT FORWARD FAIRING

(71) Applicant: The Boeing Company, Chicago, IL (US)

(72) Inventors: Kevin R. Tsai, Seattle, WA (US); Miranda Peterson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 16/458,100

(22) Filed: Jun. 30, 2019

(65) Prior Publication Data

US 2020/0407041 A1 Dec. 31, 2020

(51) Int. Cl.
| | |
|---|---|
| *B64C 3/50* | (2006.01) |
| *B64C 7/00* | (2006.01) |
| *B64C 9/16* | (2006.01) |
| *B64C 9/30* | (2006.01) |
| *B64C 13/16* | (2006.01) |

(52) U.S. Cl.
CPC .................. *B64C 3/50* (2013.01); *B64C 7/00* (2013.01); *B64C 9/16* (2013.01); *B64C 9/30* (2013.01); *B64C 13/16* (2013.01)

(58) Field of Classification Search
CPC .... B64C 3/50; B64C 9/02; B64C 9/16; B64C 9/18; B64C 9/20; B64C 9/30
See application file for complete search history.

(56) References Cited

U.S. PATENT DOCUMENTS

| | | | | |
|---|---|---|---|---|
| 2,661,166 | A * | 12/1953 | Gordon | B64C 9/16 244/216 |
| 4,283,029 | A * | 8/1981 | Rudolph | B64C 9/18 244/215 |
| 4,471,927 | A * | 9/1984 | Rudolph | B64C 9/16 244/215 |
| 10,988,232 | B2 * | 4/2021 | Crawford | B64D 29/06 |

\* cited by examiner

*Primary Examiner* — Nicholas McFall
*Assistant Examiner* — Terri L Filosi
(74) *Attorney, Agent, or Firm* — Felix L. Fischer

(57) ABSTRACT

An articulating flap support housing includes a flap connected to a wing with the flap having a range of deployed positions. An aft fairing is connected to the flap and configured to rotate with the flap through the range of deployed positions. A forward fairing is rotatably connected to the aft fairing. The forward fairing acts as a counterbalance to the aft fairing and flap.

14 Claims, 11 Drawing Sheets

ARTICULATED FLAP SUPPORT FORWARD FAIRING

BACKGROUND INFORMATION

Field

This disclosure relates generally to the field of aircraft flap extension systems and, more particularly to a flap actuation system having a flap support fairing with a forward fairing rotatably connected to the aft fairing for articulation.

Background

Aircraft employ flaps which increase camber of the wings for enhanced aerodynamic efficiency in take-off and landing. Various mechanical arrangements have been developed to deploy the flaps from retracted to extended positions. Due to fault tolerance requirements, structural elements of the flap actuation system must employ redundant load paths in the same structure. Pin inside of a pin element for pivoting connections and complementary parts fastened together to create structural elements for flap drive and trailing links are typically used to provide these redundant load paths. This requires high parts count, complex assembly and increased weight in the aircraft.

SUMMARY

Exemplary implementations of the articulating flap support housing include a flap connected to a wing with the flap having a range of deployed positions. An aft fairing is connected to the flap and configured to rotate with the flap through the range of deployed positions. A forward fairing is rotatably connected to the aft fairing. The forward fairing acts as a counterbalance to the aft fairing and flap.

BRIEF DESCRIPTION OF THE DRAWINGS

The features, functions, and advantages that have been discussed can be achieved independently in various implementations of the present invention or may be combined in yet other implementations further details of which can be seen with reference to the following description and drawings.

DETAILED DESCRIPTION

The implementations described herein provide an aft fairing connected to a flap and configured to rotate with the flap through the range of deployed positions. A forward fairing is rotatably connected to the aft fairing. The forward fairing acts as a counterbalance to the aft fairing and flap. An articulation mechanism employs a bellcrank pivotally attached to a drive link for deploying the flap with a fairing link rotatably securing the bellcrank to the forward fairing and a flap support link rotatably coupled between the bellcrank and a flap support to maintain position of the forward fairing relative to the wing as the flap deploys.

Figure 1A:
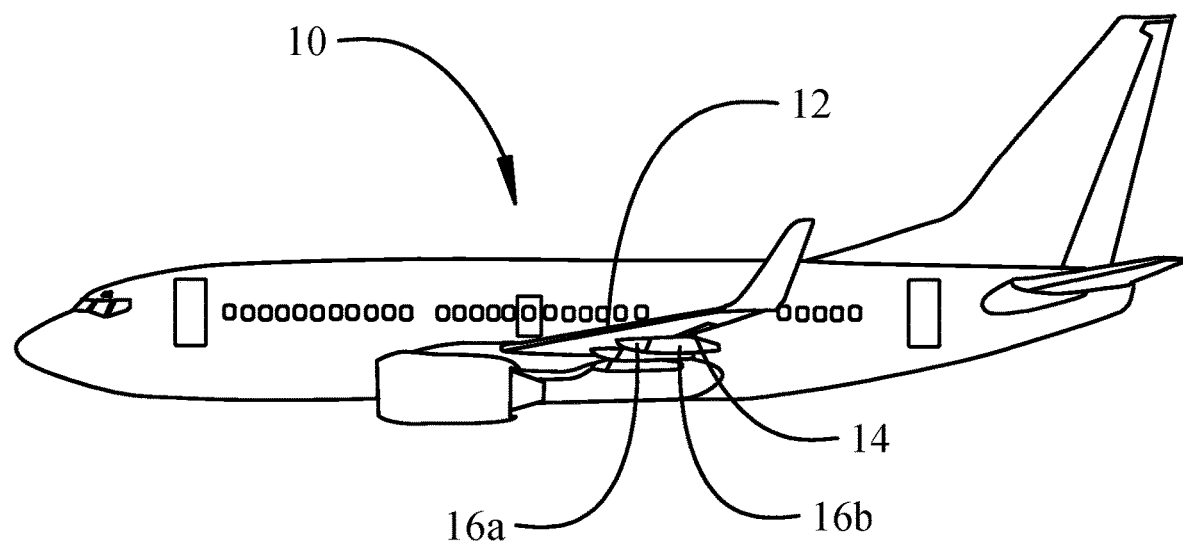
FIG. 1A is a representation of an aircraft in which the implementations disclosed herein may be employed.
Figure 1B:
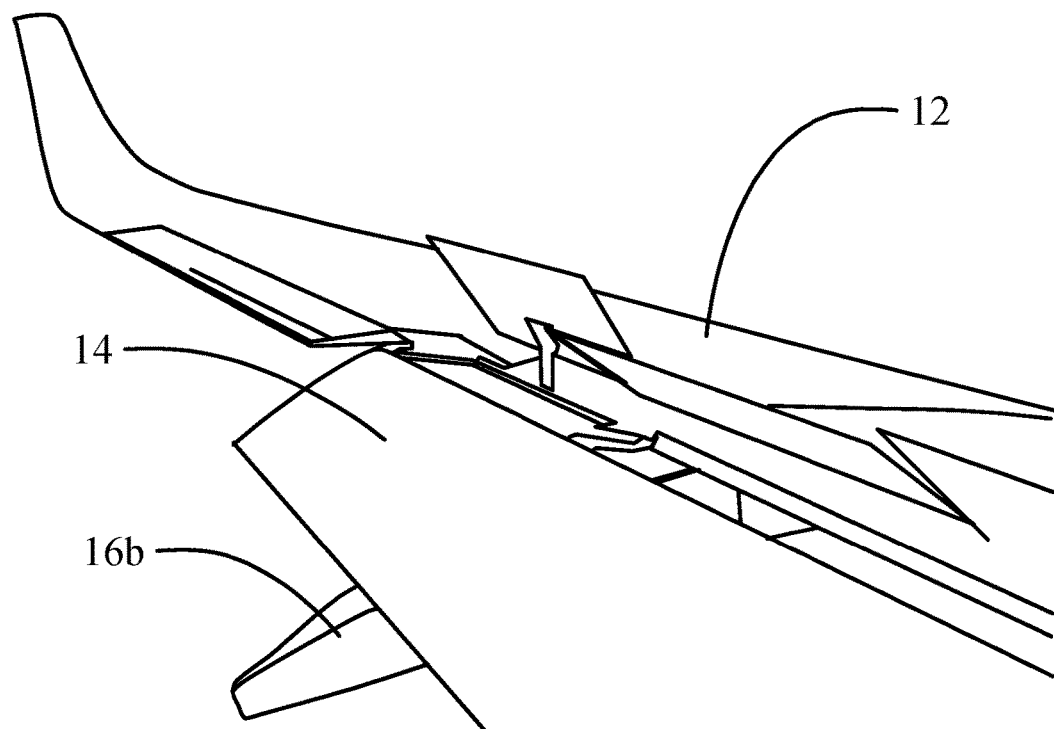
FIG. 1B is a detailed pictorial representation of the wing and flap of the aircraft of FIG. 1A.
Figure 1C:
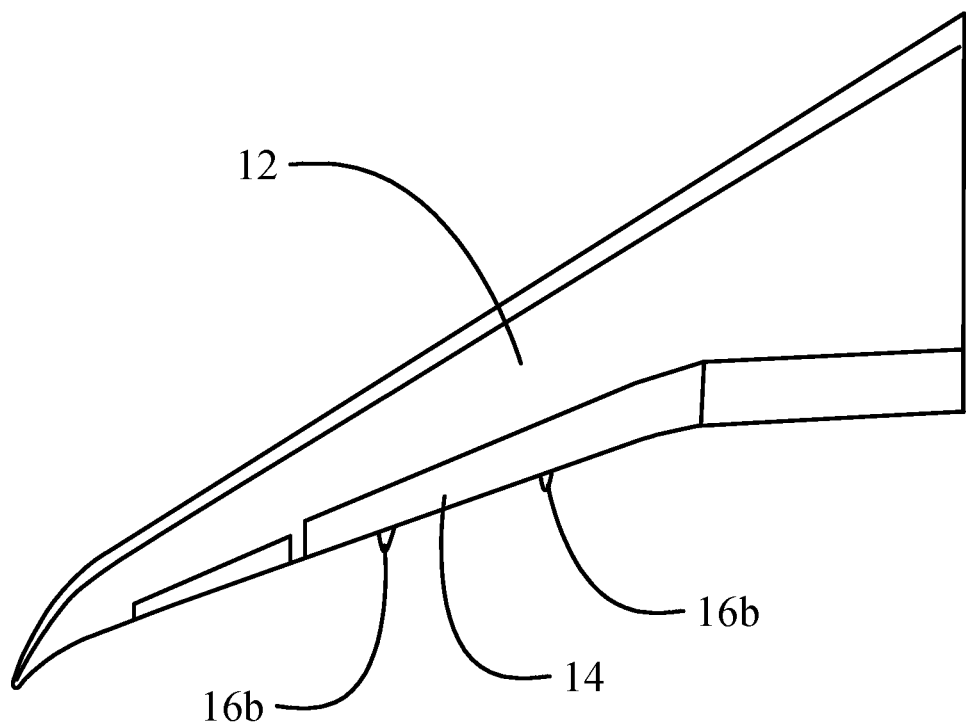
FIG. 1C is a top view of the wing and flaps of FIG. 1B.

Referring to the drawings, FIGS. 1A, 1B and 1C depict an aircraft 10 having a wing 12 with operating flaps 14. The flaps 14 are engaged to the wing 12 at multiple attachment points with underwing structures partially housed within forward fairings 16a and aft fairings 16b. Extension of the flaps 14 to enhance aerodynamic performance during takeoff and landing is accomplished with a flap deployment system 17 that causes the flaps 14 and aft fairings 16b to rotate downward relative to the wing 12 as seen in FIG. 1B.

Figure 2:
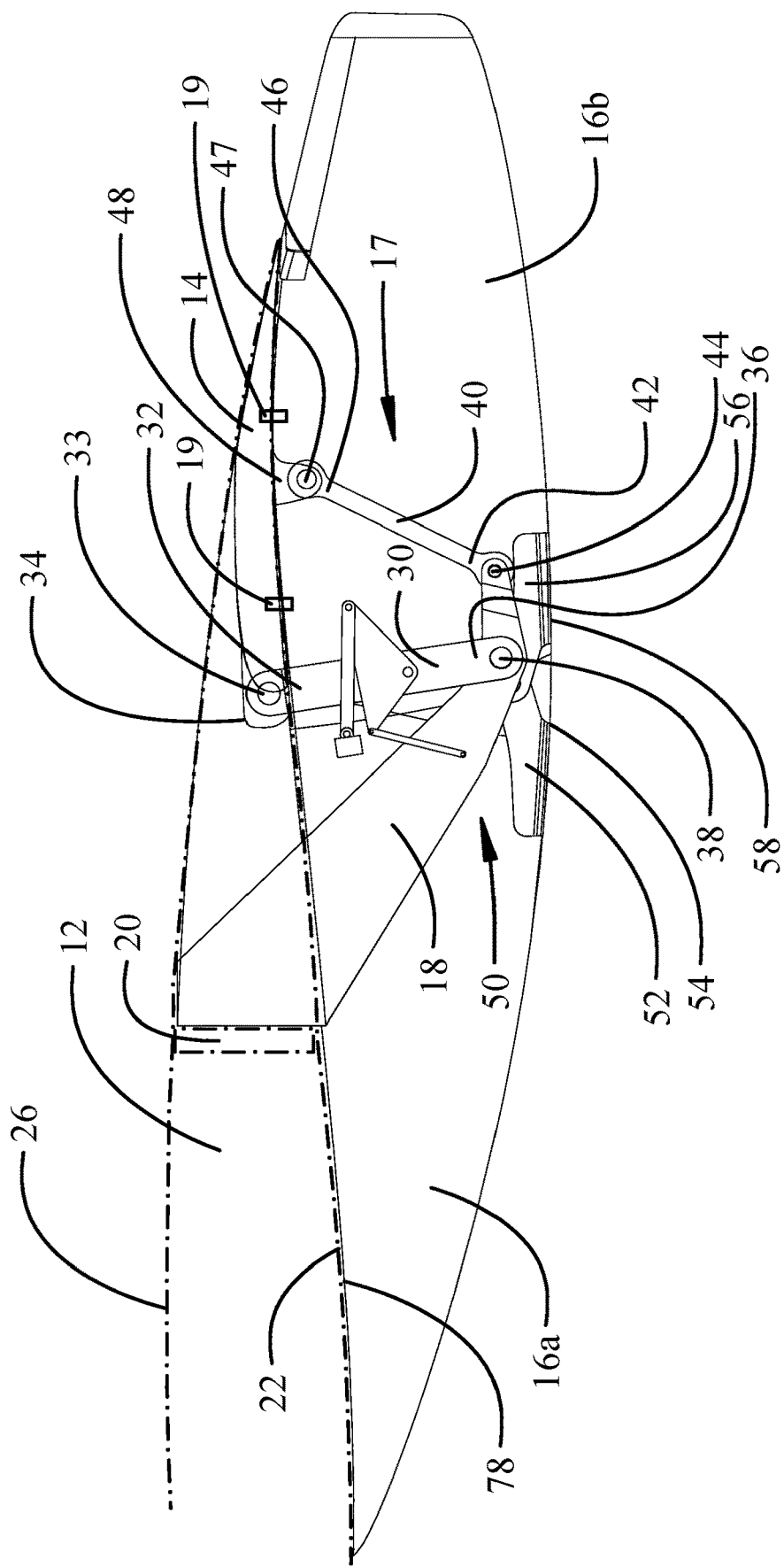
FIG. 2 is a side view of an example implementation of the balanced articulating flap support housing with the support housing sectioned to show the articulation mechanism.
Figure 3A:
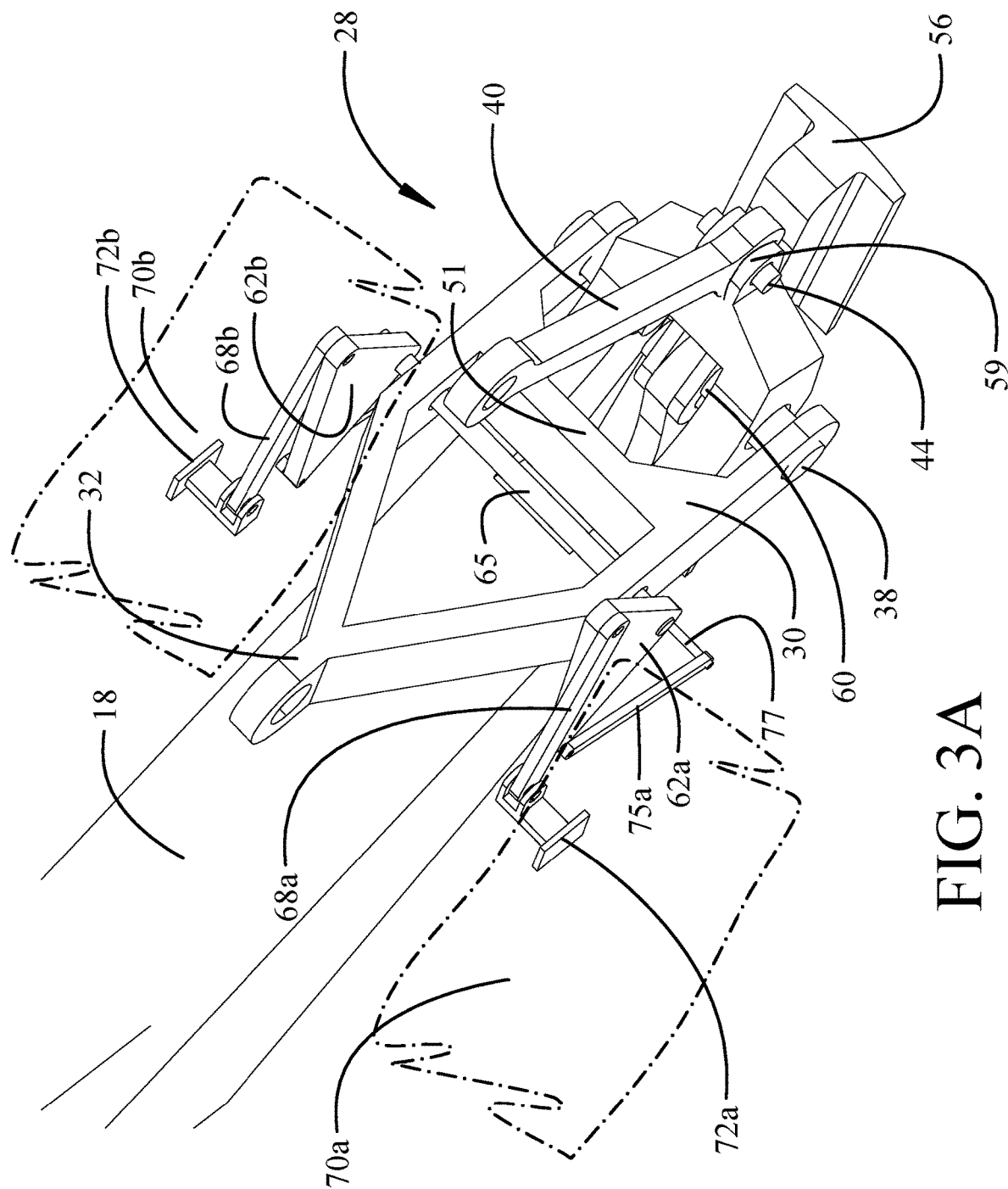
FIG. 3A is an upper aft pictorial detailed representation of the elements of the example implementation (with the forward and aft fairings removed for clarity)
Figure 3B:
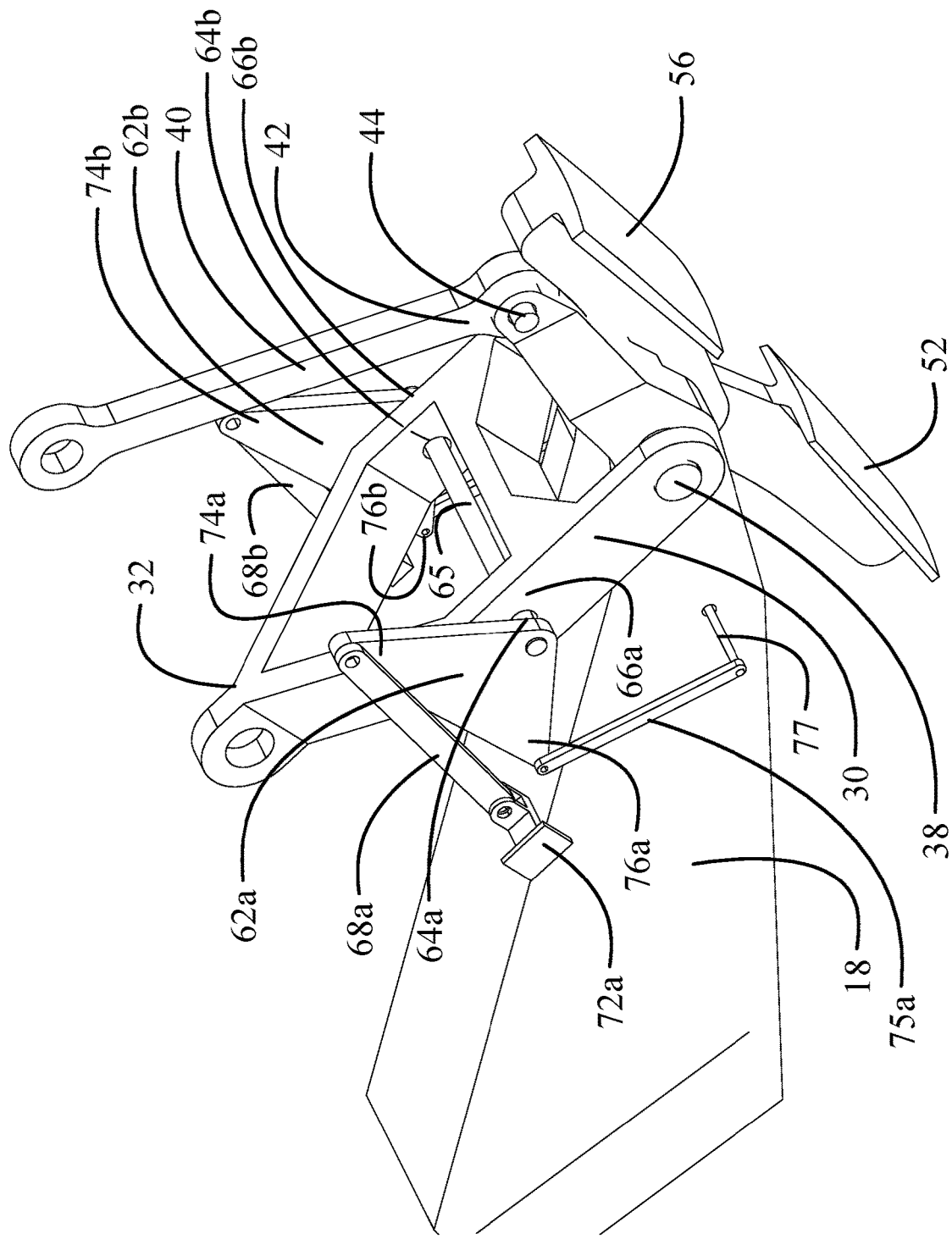
FIG. 3B is a lower aft pictorial detailed representation of the elements of the example implementation.
Figure 3C:
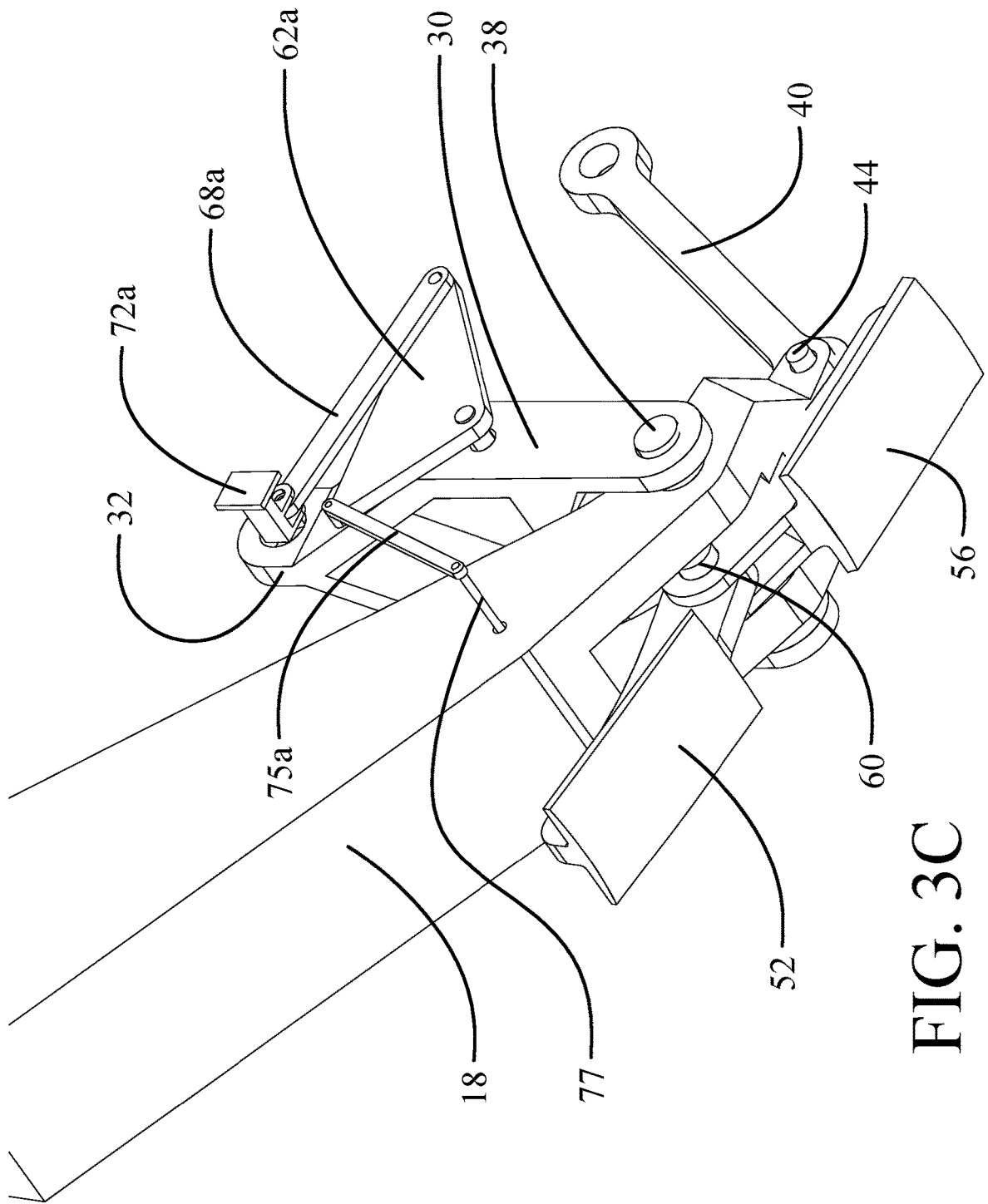
FIG. 3C is a lower forward pictorial detailed representation of the elements of the example implementation.
Figure 3D:
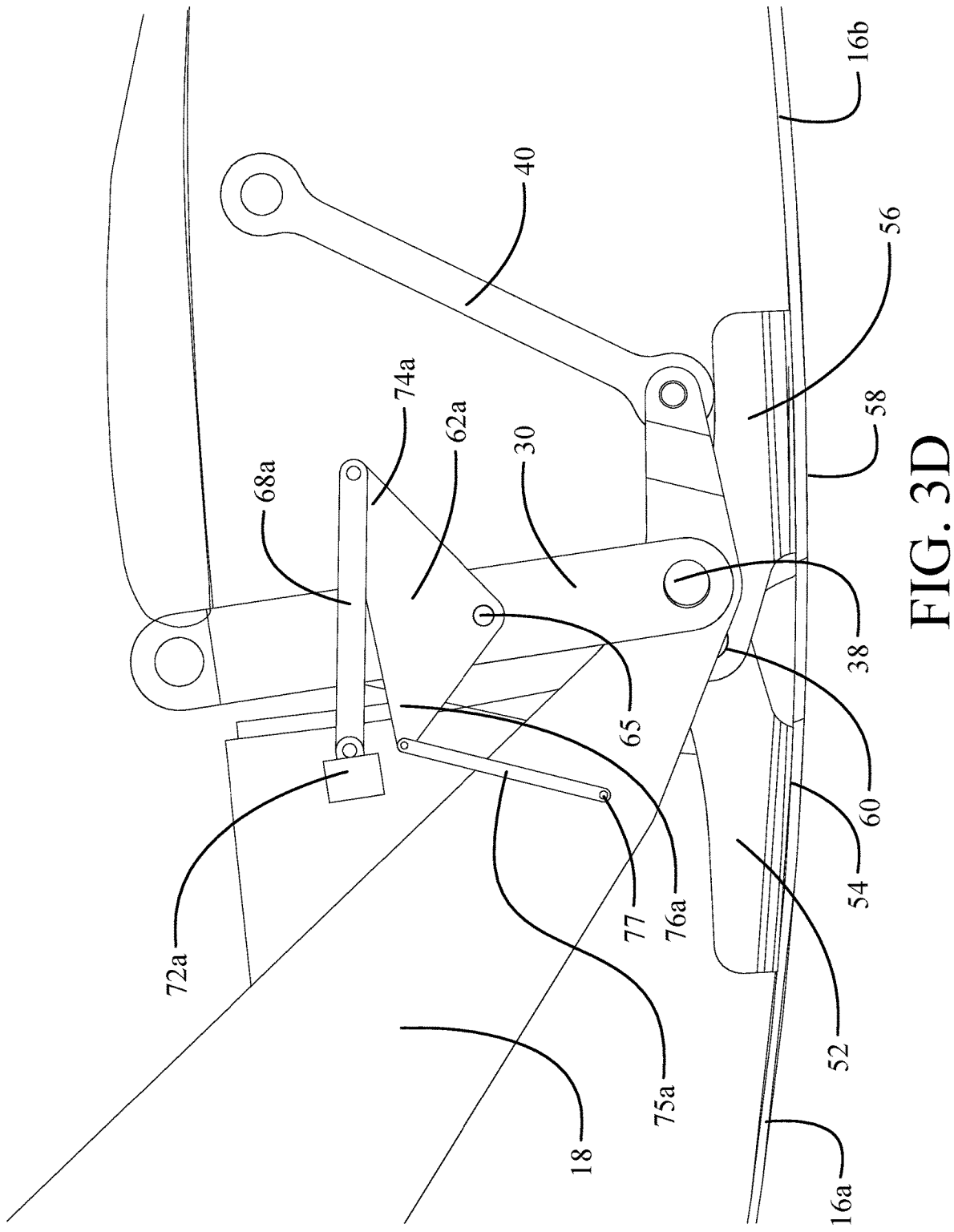
FIG. 3D is a detailed side representation of the elements of the example implementation.

As seen in FIG. 2, at each attachment point a flap support 18 provides fixed wing structure to attach the flaps 14 and associated operating support links and actuators (to be described in greater detail subsequently) to the wing 12 in a wing assembly. The flap support 18, for the example implementation, is attached to the wing 12 on an aft spar 20 within the wing structure and partially housed within the forward fairing 16a. The aft spar 20 extends upward within the wing 12 from the lower wing skin 22 and the flap support 18 is attached to the rear spar between the lower skin and upper skin 26. The aft fairing 16b encases the flap support 18 and the flap deployment system 17 in the retracted position. The aft fairing 16b is attached to the flap 14 and rotates downward as the flap is deployed. In the example implementation mechanical fasteners 19 engage the aft fairing to the flap 14. In alternative implementations, the aft fairing 16b may be bonded to or integrally formed with the flap 14.

As seen in greater detail in FIGS. 3A-3D for a first example implementation, the flap 14 is deployed by drive assembly 28 having a flap drive link 30 with a first end 32 pivotally coupled with a drive axle 33 to a forward fitting 34 on the flap 14. A second end 36 of the flap drive link 30 is pivotally coupled to the flap support 18 with a first pivot axle 38. A trailing link 40 has a leading end 42 pivotally coupled with a second pivot axle 44 proximate an aft end of the flap support 18. A trailing end 46 of the trailing link 40 is pivotally coupled with a reaction axle 47 to an aft fitting 48 on the flap 14.

For the exemplary implementation as shown, the flap drive link 30 has a spanning clevis 51 engaging the first pivot axle 38 on opposite sides of the flap support 18. In the example implementation shown in the drawings, first pivot axle 38 is bifurcated to allow clearance within the spanning clevis 51. Spanning clevis 51 terminates at the first end 32 of the flap drive link 30. The flap support 18 terminates in an end clevis 59 which engages the leading end 42 the trailing link 40 and the second pivot axle 44 constrains the trailing link in the end clevis. The flap 14 is engaged and supported by the flap drive link 30 and trailing link 40 and, in turn, supports the attached aft fairing 16b.

The forward fairing 16a is rotatably connected to the aft fairing 16b acting as a counterbalance to the aft fairing and flap 14. An articulation mechanism 50 interconnects the aft fairing 16b and the forward fairing 16a. The articulation mechanism 50 is configured to maintain a position of the forward fairing relative to the wing through the range of deployed positions, as will be described in greater detail subsequently. In the example implementation the articulation mechanism includes a forward fairing attachment foot 52 engaged to a bottom aft end 54 of the forward fairing 16a. An aft fairing attachment foot 56 is engaged to a bottom forward end 58 of the aft fairing 16b. The aft fairing attachment foot 56 is pivotally connected to the forward fairing attachment foot 52 with a balance axle 60 (best seen in FIG. 3C) allowing the forward fairing 16a to rotate relative to the aft fairing 16b.

In the example implementation, the articulation mechanism 50 further employs an outboard bellcrank 62a having a first central pivot 64a on an outboard side 66a of the flap drive link 30 and an inboard bellcrank 62b having a second central pivot 64b on an inboard side 66b of the flap drive link 30. The central pivot of the outboard bellcrank and inboard bellcrank is supplied in the example implementation with a pivot pin 65 extending through the flap drive link 30. An outboard fairing link 68a is rotatably connected to a pad 72a secured proximate an upper aft outboard end portion 70a of the forward fairing 16a and rotatably connected to a first arm 74a of the outboard bellcrank 62a. An outboard flap support link 75a is rotatably connected between the flap support 18 and a second arm 76a of the outboard bellcrank 62a. Similarly, an inboard fairing link 68b is rotatably connected to a pad 72b secured proximate an upper aft inboard end portion 70b of the forward fairing 16a and rotatably connected to a first arm 74b of the inboard bellcrank 62b. An inboard flap support link 75b is rotatably connected between the flap support 18 and a second arm 76b of the inboard bellcrank 62b. the flap support links 75a and 75b provide a pivotally fixed constraint for the bellcranks 62a and 62b relative to the wing 12 through the flap support 18. For the example implementation rotatable connection of the outboard flap support link 75a and inboard flap support link 75b to the flap support 18 is provided by a second pivot pin 77 extending through the flap support.

Rotation of the flap drive link 30 with the pivotally attached bellcranks 62a, 62b with the second arms of the bellcranks constrained by the flap support links 75a, 75b causes rotation of the bellcranks to orient the fairing links 68a, 68b to maintain position of the forward fairing 16a relative to the lower wing skin 22 while the forward fairing 16a rotates on the balance axle 60 relative to the aft fairing 16b through the attachment feet 52, 56. A compressible or expandable seal or similar structure may be employed at the interface 78 (as seen in FIG. 2) between the forward fairing 16a and lower wing skin 22 of the wing 12 to maintain aerodynamic continuity between the forward fairing and wing for slight gaps which may occur.

Figure 4:
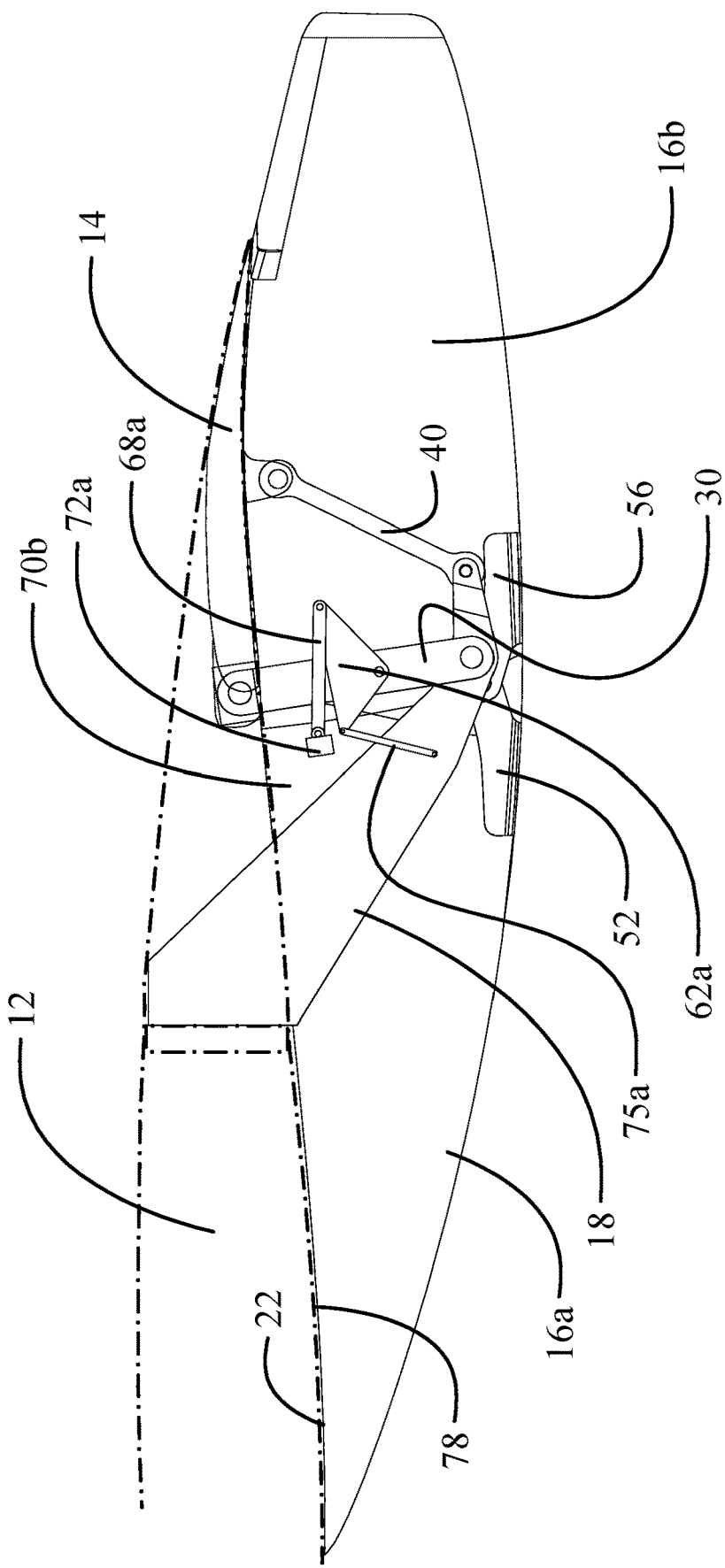
FIG. 4 is a side view of the example implementation with the flap in the retracted position.
Figure 5:
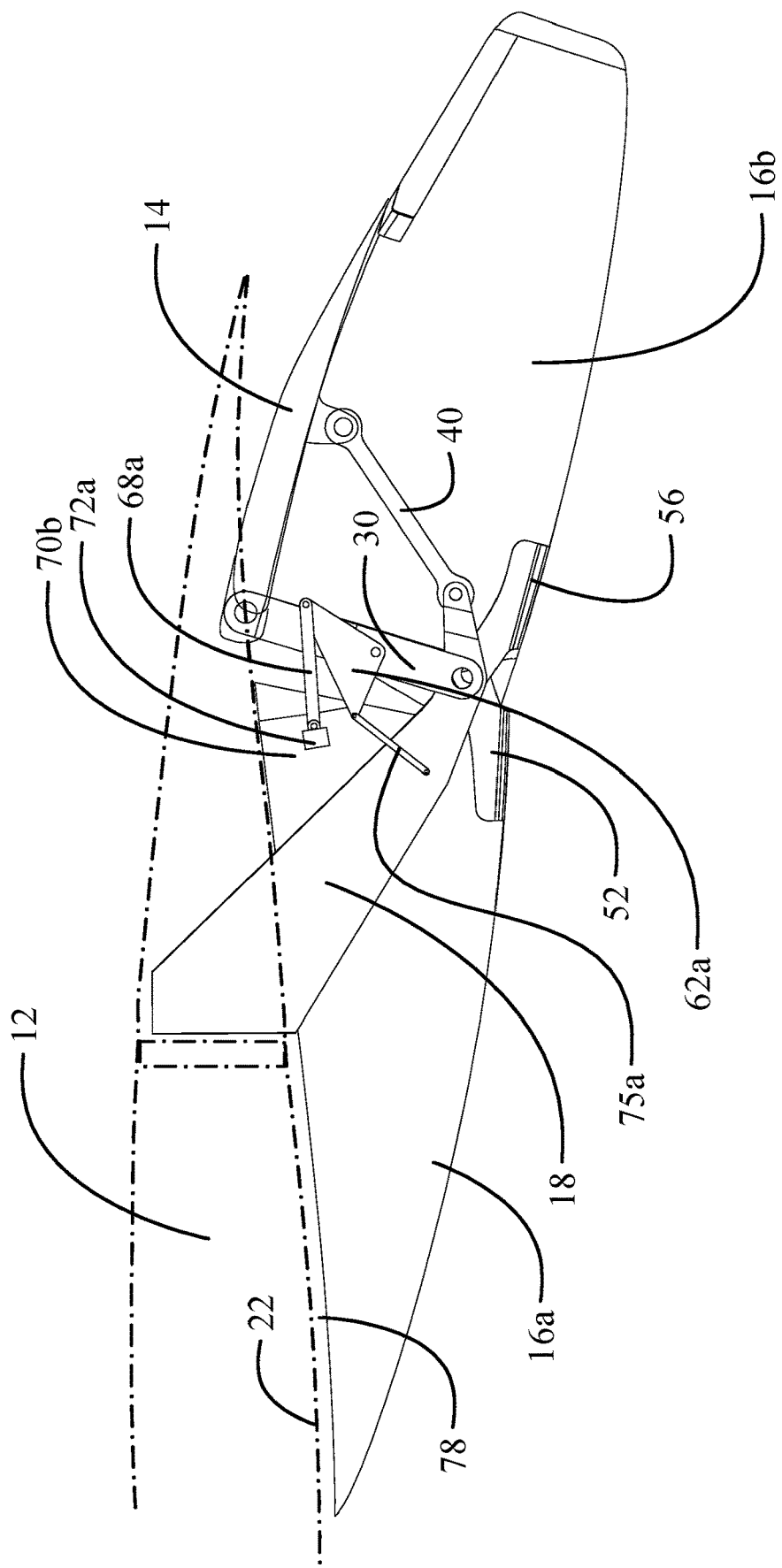
FIG. 5 is a side view of the example implementation with the flap in the half-extended position.
Figure 6:
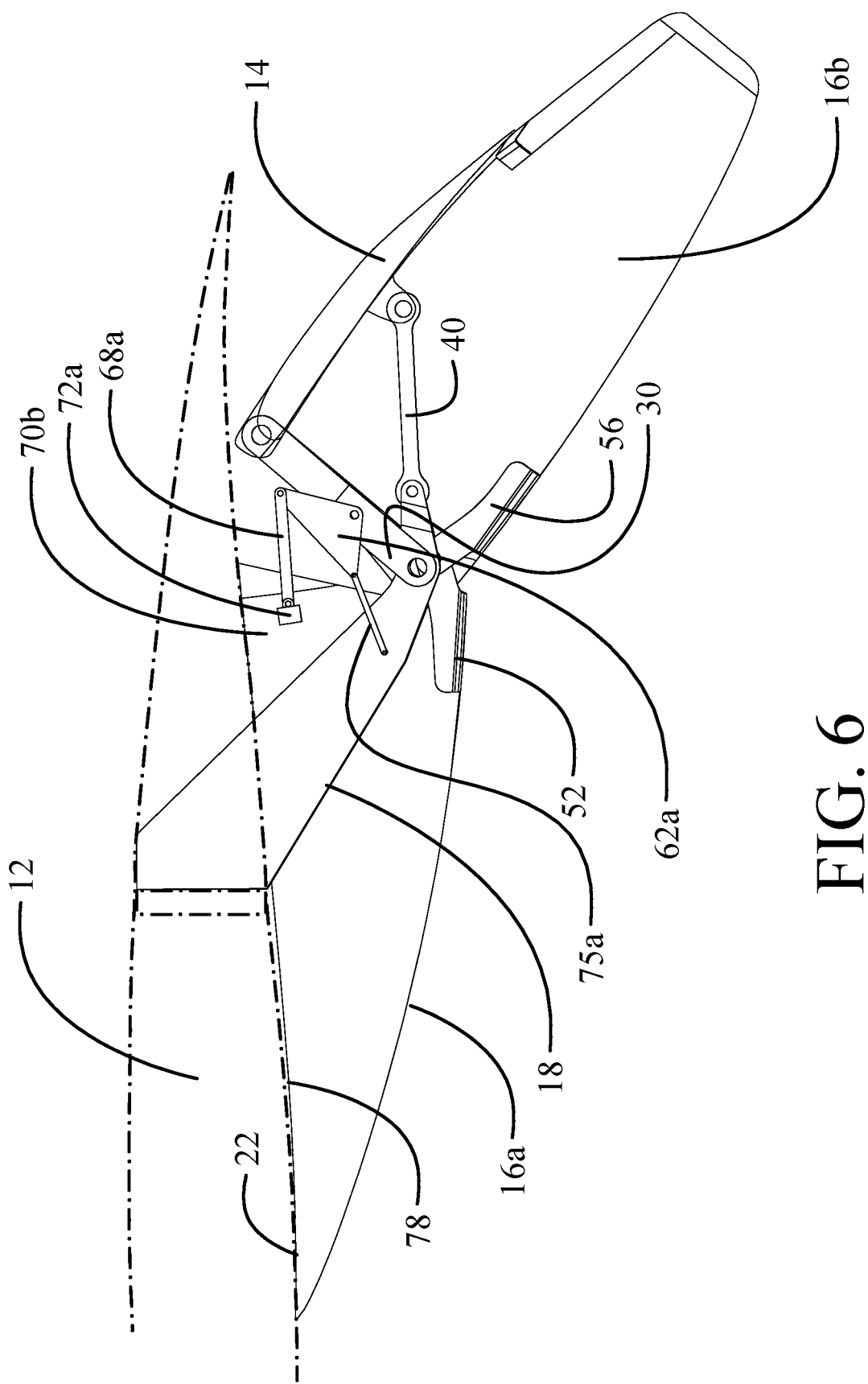
FIG. 6 a side view of the example implementation with the flap in the fully extended position; and, FIG. 7 is a flow chart of a method for flap deployment and backup loading of the catcher link using the exemplary implementations.

An actuator (not shown) in the flap deployment system 17 is operably connected to rotate the flap drive link 30 about the first pivot axle 38 to move the flap 14 between a retracted position and a deployed or lowered position. FIG. 4 shows the flap 14 and flap deployment system 17 in the fully retracted position, FIG. 5 shows a partially extended position and FIG. 6 shows the fully extended position. Deployment of the flap 14 is accomplished with rotation of the flap drive link 30 about the first pivot axle 38. The flap 14 urges the trailing end 46 of the trailing link 40 rearward causing the aft trailing link to rotate about the second pivot axle 44 drawing the flap 14 and aft fairing 16b downward responsive to the rotation of the flap drive link 30. Retracting the flap is accomplished by rotating the flap drive link 30 in a second direction.

The flap 14 carries the directly connected aft fairing 16b through the rotation during extension and retraction. The forward fairing 16a is not connected to the wing 12 or lower wing skin 22 and is supported by the aft fairing 16b solely through the articulation mechanism 50. The attachment feet 52 and 56 directly rotationally engage the forward fairing 16a and aft fairing 16b for rotation about balance axle 60 while remainder of the articulation mechanism 50 is configured whereby the bellcranks 62a and 62b, constrained by the pivotally attached flap support links 75a, 75b, position the fairing links 68a, 68b to maintain the relative orientation between the forward fairing and the lower wing skin 22. The forward fairing 16a provides a counterbalance for the aft fairing 16b and flap 14.

Figure 7:
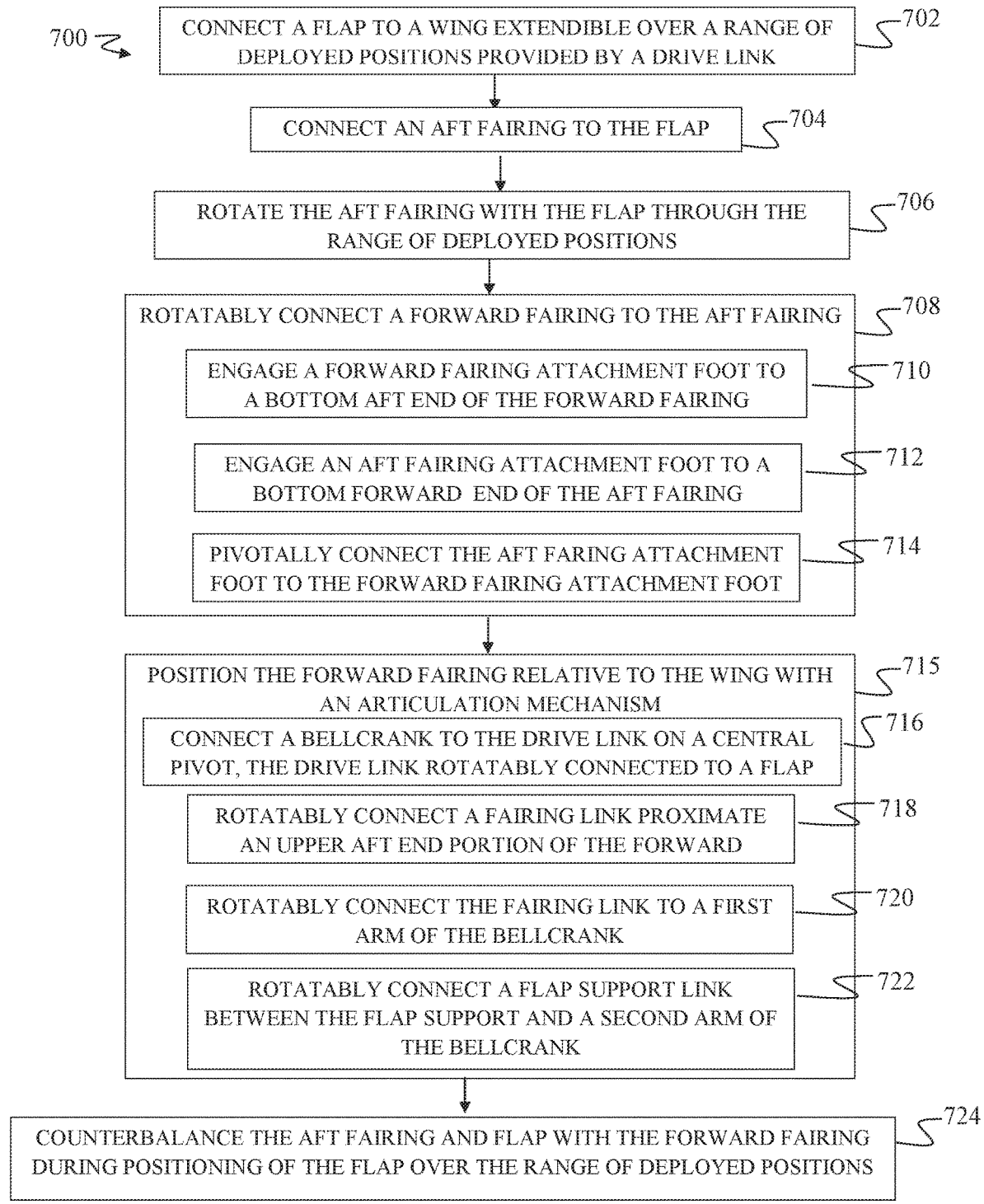

The implementations disclosed herein provide a method 700 for counterbalancing a deployable flap 14 and aft fairing 16b as shown in FIG. 7. A flap 14 is connected to a wing 12, step 702, the flap having a range of deployed positions provided by rotating a drive link. An aft fairing 16b is connected to the flap 14, step 704, and the aft fairing is rotated with the flap through the range of deployed positions, step 706. A forward fairing 16a is rotatably connected to the aft fairing 16b, step 708, by engaging a forward fairing attachment foot to a bottom aft end of the forward fairing, step 710, engaging an aft fairing attachment foot to a bottom forward end of the aft fairing, step 712, and pivotally connecting the aft fairing attachment foot to the forward fairing attachment foot, step 714, whereby the forward fairing rotates relative to the aft fairing. Position of the forward fairing relative to the wing is maintained by an articulation mechanism, step 715, wherein at least one bellcrank is connected at a central pivot to the drive link having a first end rotatably connected to an underwing beam (flap support) and a second end rotatably connected at a first pivot proximate a forward end of the flap, step 716. At least one fairing link is rotatably connected proximate an upper aft end portion of the forward fairing, step 718, and the at least one faring link is rotatably connected to a first arm of the at least one bellcrank, step 720. At least one flap support link is rotatably connected between the flap support and a second arm of the at least one bellcrank, step 722. The forward fairing acts as a counterbalance to the aft fairing and the flap, step 724, during rotating of the drive link to position the flap over the range of deployed positions.

Having now described various implementations of the invention in detail as required by the patent statutes, those skilled in the art will recognize modifications and substitutions to the specific implementations disclosed herein. Such modifications are within the scope and intent of the following claims. Within the claims the terms "comprising", "including", "having" and "containing" are intended to be open and additional or equivalent elements may be present.

What is claimed is:

1. An articulating flap support housing comprising:
   a flap connected to a wing, the flap having a range of deployed positions;
   an aft fairing connected to the flap and configured to rotate with the flap through the range of deployed positions;
   a forward fairing rotatably connected to the aft fairing, the forward fairing acting as a counterbalance to the aft fairing and flap; and an articulation mechanism interconnecting the aft fairing and the forward fairing, the articulation mechanism configured to maintain a position of the forward fairing relative to the wing through the range of deployed positions, wherein the articulation mechanism comprises:
a forward fairing attachment foot engaged to a bottom aft end of the forward fairing; and
an aft fairing attachment foot engaged to a bottom forward end of the aft fairing, the aft fairing attachment foot pivotally connected to the forward fairing attachment foot whereby the forward fairing rotates relative to the aft fairing.

2. The articulating flap support housing as defined in claim 1 further comprising: a flap support mounted to the wing; and a flap deployment system connecting the flap support and the flap, the flap deployment system configured to extend and rotate the flap through the range of deployed positions.

3. The articulating flap support housing as defined in claim 2 wherein the flap deployment system comprises:
a drive link having a first end rotatably connected at a forward fitting proximate a forward end of the flap and a second end rotatably connected to the flap support, the drive link rotatable for extending the flap over the range of deployed positions; and,
a trailing link having a leading end rotatably connected to the flap support and a trailing end rotatably connected to an aft fitting on the flap, the trailing link configured to urge the flap to rotate downward responsive to rotation of the drive link.

4. The articulating flap support housing as defined in claim 1 further comprising a balance axle rotatably connecting the aft faring attachment foot and the forward faring attachment foot.

5. The articulating flap support housing as defined in claim 1 wherein the articulation mechanism further comprises: at least one bellcrank having a central pivot connected to the drive link; at least one fairing link connected proximate an upper aft end portion of the forward fairing and rotatably connected to a first arm of the at least one bellcrank; and, at least one flap support link rotatably connected between the flap support and a second arm of the at least one bellcrank.

6. The articulating flap support housing as defined in claim 5 wherein
the at least one bellcrank comprises an outboard bellcrank having a first central pivot on an outboard side of the drive link and an inboard bellcrank having a second central pivot on an inboard side of the drive link;
the at least one fairing link comprises an outboard fairing link connected to an upper aft end of an outboard side of the forward fairing and rotatably connected to a first arm of the outboard bellcrank and an inboard fairing link connected to an upper aft end of an inboard side of the forward fairing and rotatably connected to a first arm of the inboard bellcrank; and,
the at least one flap support link comprises an outboard flap support link connected to an outboard side of the flap support and a second arm of the outboard bellcrank and an inboard flap support link connected to an inboard side of the flap support and a second arm of the inboard bellcrank.

7. The articulating flap support housing as defined in claim 6 wherein the outboard fairing link is rotatably connected to a first pad secured to the upper aft end of the outboard side of the forward fairing and the inboard fairing link is rotatably connected to a second pad secured to the upper aft end of the inboard side of the forward fairing with a second rotatable pad.

8. The articulating flap support housing as defined in claim 6 wherein the first central pivot of the outboard bellcrank and second central pivot of the inboard bellcrank are provided by a first pivot pin extending through the drive link.

9. The articulating flap support housing as defined in claim 6 wherein rotatable connection of the outboard flap support link and inboard flap support link to the flap support is provided by a second pivot pin extending through the flap support.

10. An aircraft wing assembly comprising:
a wing;
a flap support mounted to the wing;
a drive link having a first end rotatably connected at a first pivot proximate a forward end of a flap and a second end rotatably connected to the flap support, the drive link rotatable for extending the flap over a range of deployed positions;
an aft fairing connected to the flap and configured to rotate with the flap through the range of deployed positions;
a forward fairing rotatably connected to the aft fairing to the aft fairing and acting as a counterbalance to the aft fairing and the flap; and
an articulation mechanism having
a forward fairing attachment foot engaged to a bottom aft end of the forward fairing and an aft fairing attachment foot engaged to a bottom forward end of the aft fairing, the aft fairing attachment foot pivotally connected to the forward fairing attachment foot whereby the forward fairing rotates relative to the aft fairing;
an outboard bellcrank having a central pivot connected to an outboard side of the drive link; an outboard fairing link connected to an upper aft end of an outboard side of the forward fairing and rotatably connected to a first arm of the outboard bellcrank;
an outboard flap support link connected to an outboard side of the flap support and a second arm of the outboard bellcrank;
an inboard bellcrank having a central pivot connected to a inboard side of the drive link;
an inboard fairing link connected to an upper aft end of an inboard side of the forward fairing and rotatably connected to a first arm of the inboard bellcrank; and
an inboard flap support link connected to an inboard side of the flap support and a second arm of the inboard bellcrank.

11. The aircraft wing assembly as defined in claim 10 wherein the articulation mechanism is configured to maintain relative orientation between the forward fairing and a lower wing skin.

12. A method for counterbalancing a deployable flap and aft fairing, the method comprising:
connecting a flap to a wing, the flap having a range of deployed positions;
connecting an aft fairing to the flap;
rotating the aft fairing with the flap through the range of deployed positions;
rotatably connecting a forward fairing solely through an articulation mechanism to the aft fairing, the forward fairing acting as a counterbalance to the aft fairing and the flap;
interconnecting the aft fairing and the forward fairing with an articulation mechanism; and maintaining a position of the forward fairing relative to the wing through the range of deployed positions with the articulation mechanism,
    wherein the step of interconnecting the aft fairing and the forward fairing further comprises:
        engaging a forward fairing attachment foot to a bottom aft end of the forward fairing;
        engaging an aft fairing attachment foot to a bottom forward end of the aft fairing; and
        pivotally connecting the aft fairing attachment foot to the forward fairing attachment foot whereby the forward fairing rotates relative to the aft fairing.

13. The method as defined in claim 12 wherein the step of interconnecting the aft fairing and the forward fairing further comprises:
    connecting at least one bellcrank, rotatable at a central pivot, to a drive link, the drive link having a first end rotatably connected at a first pivot proximate a forward end of the flap and a second end rotatably connected to a flap support;
    rotating the drive link for extending the flap over the range of deployed positions;
    rotatably connecting at least one fairing link proximate an upper aft end portion of the forward fairing and rotatably connecting the at least one faring link to a first arm of the at least one bellcrank; and
    rotatably connecting at least one flap support link between the flap support and a second arm of the at least one bellcrank.

14. The method as defined in claim 13 wherein the step of connecting at least one bellcrank comprises rotatably connecting an outboard bellcrank to an outboard side of the drive link and rotatably connecting an inboard bellcrank to an inboard side of the drive link, and the step of rotatably connecting at least one fairing link comprises rotatably connecting an outboard flap support link to an outboard upper aft portion of the forward fairing and rotatably connecting an outboard faring link to a first arm of the outboard bellcrank, and rotatably connecting an inboard flap support link to an inboard upper aft portion of the forward fairing and rotatably connecting an inboard faring link to a first arm of the inboard bellcrank, and the step of rotatably connecting at least one flap support link comprises rotatably connecting an outboard flap support link between the flap support and a second arm of the outboard bellcrank and rotatably connecting an inboard flap support link between the flap support and a second arm of the inboard bellcrank.

* * * * *